$$3,766,100$$
Patented Oct. 16, 1973

3,766,100
RIGID PHENOLIC FOAMS SUITABLE FOR USE AS NON-FLAMMABLE INSULATING MATERIAL
Hans Albrecht Meyer-Stoll, Rheinkamp, and Heinz Berndt, Eick-Ost, Germany, assignors to Deutsche Texaco Aktiengesellschaft, Hamburg, Germany
No Drawing. Filed May 7, 1971, Ser. No. 141,379
Int. Cl. C08g 53/10; C08j 1/26
U.S. Cl. 260—2.5 FP
11 Claims

ABSTRACT OF THE DISCLOSURE

Non-flammable, rigid, foamed phenol-formaldehyde resin compositions are prepared by first forming a mixture of a phenol-formaldehyde resol solution, water glass and a foaming or expanding agent, and then adding an acid curing agent to initiate the foaming and curing reactions. Such compositions are useful as insulation materials, as structural elements, etc.

FIELD OF THE INVENTION

This invention relates to improved rigid phenolic foams containing inorganic filler materials and to a process for their manufacture. These novel foamed products are useful as non-flammable insulating materials.

DESCRIPTION OF THE PRIOR ART

Rigid phenolic foams are used as a material for insulation, coating, filling of hollow spaces, packing, decorating, and for a diversity of molded pieces and structural elements. For all of these uses non-flammability, mechanical strength, insulating capacity and low weight per unit of volume are required or at least desirable.

It is known to mix liquid phenolic formaldehyde resols with inorganic filler materials and a curing agent. The curing agent induces the exothermal curing reaction of the resol. The heat which is thereby liberated vaporizes the foaming agent. As the bubbles of the foaming agent are formed the mixture becomes increasingly viscous and this action continues the more it is cured and expanded. Thus a foam is formed which is hard upon completion of the curing reaction. Examples of inorganic filler materials are asbestos, clay, mica, glass fibers, kieselguhr or boric acid. The foaming agent may be, for example, a low-boiling hydrocarbon. The curing agent is an acid or an acidic salt and is sometimes referred to as an acid hardening agent.

The known fillers do impart a higher non-flammability to rigid phenolic foams filled therewith as compared to unfilled foams; however, at the same time they impede the penetration of the foam into hollow spaces, as they substantially reduce the flow of the yet uncured foam. For this reason the filling of, for instance, extensive narrow interspaces in double-walled buildings, holds or automobile bodies with the known rigid phenolic foams is rather unsatisfactory, if not impossible. With the present state of the art, one would either have to do without the non-flammable filler materials or be content with a highly incomplete foaming which in most cases would not extend beyond the interspace inlets.

SUMMARY OF THE INVENTION

It is an object of this invention to eliminate these disadvantages and solve insulation problems especially where the hollow spaces to be filled with insulating materials are accessible but with particular difficulty and where high non-flammability is required. The invention set forth herein has solved this problem by offering a rigid phenolic foam containing water glass for use as a non-flammable insulating material. According to this invention an aqueous phenolic formaldehyde resol is mixed with a water glass solution, followed by adding a pulverulent filler material, the foaming agent or expanding agent as it is sometimes referred to, and finally the curing agent. The expanding agent used may also be a carbonate, such as finely ground calcium carbonate, magnesium carbonate, dolomite, etc., which forms carbon dioxide with the acidic curing agent. Said mixture is charged to molds or to the hollow spaces to be filled, where it foams and hardens simultaneously.

Examples of hollow spaces to be filled are double-walls and ceilings in ships, railway carriages, houses or interspaces in automobile bodies which are not easily accessible. The novel phenol-formaldehyde compositions of this invention which contain water glass however are suitable also for the manufacture of any type of molded piece. Molded pieces are obtained by charging the mixture to molds and removing the molded pieces therefrom after the foam has hardened.

It is also possible to employ the rigid, foamed phenol-formaldehdye resin compositions of this invention for the insulation of outer surfaces. For this purpose the above described mixture is cast or sprayed onto the material to be insulated. Foam layers rise on the material and harden during this rising process. By successively adding more of the mixture onto the preceding foam layer, which may have completely or incompletely hardened, a foam layer of any degree of thickness may be formed. Thus, for instance, outdoor storage tanks or temporary accommodation facilities may be insulated outside by spraying the mixture of this invention thereon while it is in its initial foaming stage.

Owing to the fact that phenolic formaldehyde resols and their cured products are compatible with water glass, relatively large amounts of the latter may be incorporated into the rigid phenolic foam. The amount of water glass contained in the rigid phenolic foam accounts for the relatively low cost of the use of the rigid phenolic foam according to this invention.

DETAILED DESCRIPTION OF THE INVENTION

In preparing the novel, non-flammable, rigid, foamed phenol-formaldehyde resin compositions of this invention, the mixing of the ingredients is suitably effected with high-speed stirrers. The phenol formaldehyde resol is obtained by alkaline condensation in a manner known per se of phenol with formaldehyde, using about 1.5 to about 2 moles of formaldehyde per mole of phenol. The aqueous phenolic formaldehyde resol employed will contain from about 25 to about 35 percent by weight of water. The water glass solution contains sodium and/or potassium silicate in a concentration such that 100 parts by weight of the water glass solution will contain about 40 to about 60 parts by weight of water. As foaming agents paraffins having 4 to 6 carbon atoms, such as butane, pentane, isopentane, hexane, isohexane, etc, and mixtures thereof, low-boiling halogenated hydrocarbons, such as methylene chloride, etc. or pulverulent carbonates are used. Additionally, inorganic filler material such as mica dust, asbestos dust, kieselguhr, colloidal silica, talcum or another pulverulent mineral, preferably vermiculite, may be used. Any of the acid or acidic salt type curing agents commonly employed in preparing phenol-formaldehyde resins, such as toluene sulfonic acid, hydrochloric acid, sulfuric acid, phosphoric acid, etc. can be utilized in preparing the foamed products of this invention.

The preferred aqueous phenolic formaldehyde resol to water glass solution ratio is about 1 kg. of aqueous resol per 50 to 300 g. of water glass solution.

The following example which illustrates one embodiment of this invention is to be considered not limitative.

EXAMPLE 5000 g. of aqueous phenolic formaldehyde resol (char. by a phenol to formaldehyde ratio of 1 to 1.64, 27 to 30 percent by weight of water, and a viscosity of 1200 to 2000 cp.) and 1000 g. of a sodium silicate solution (100 g. of this solution having a solids content of 45 to 50 g.) were mixed to form a homogeneous mixture. There was then added with mixing 600 cm.$^3$ of technical pentane boiling within the range of 33 and 40° C. and 1750 g. of vermiculite (95 percent through a sieve with a mesh inside width of 2.5 mm). Then 3750 g. of aqueous toluene sulfonic acid solution (50 weight percent solution) was added with stirring within 20 to 30 seconds and the whole mixture was poured into a parallelepiped mold open at the upper side and having a basal surface of 1000 cm.$^2$. The mixture foamed and hardened simultaneously in this mold. After about 30 minutes the parallelepiped block formed was removed from the mold. The weight per unit volume of said block was measured and found to be 0.06 g./cm.$^3$. From the middle portion of said block a round disk (20 cm. in diameter and 4 cm. in thickness) was sawed out which was exposed centrally to a Bunsen burner flame for a period of five minutes. As a result a concentric circular area on one side of the disk was blackened but the disk did not burn.

The rigid foamed phenol-formaldehyde block formed in this example is suitable for use as a structural element. Likewise the same block can be sawed into panels having a thickness of about 1 cm. which are useful as insulating materials in double-walled aluminum structural panels.

To demonstrate the surprising effect achieved by the addition of water glass to the foamed phenolic resin compositions of this invention a second foamed specimen was prepared in the same manner as in the example, except that the water glass was omitted from the formulation. By varying the amount of pentane and diminishing the hardening solution (i.e., the acid catalyst) to 1250 cm.$^3$ the same weight per unit of volume of the finished rigid foam block, i.e. 0.06 g./cm.$^3$ as in the preceding example, was obtained. After exposing the specimen to the Bunsen burner flame it started smoldering after five minutes, and this smoldering action continued even after removal of the Bunsen burner flame.

When using the foamed phenolics of this invention no additional filler materials are required. Thus, the valuable rigid foamed products are produced by mixing the phenolic formaldehyde resol and water glass solution and adding a foaming agent and a curing agent.

What is claimed is:

1. A process for preparing a non-flammable, rigid, foamed phenol-formaldehyde resin composition which comprises:
    (a) preparing a liquid preblend mixture of an aqueous phenol-formaldehyde resol solution having a phenol formaldehyde mole ratio of about 1.5 to about 2, a water glass solution and a foaming agent, the said resol solution containing from about 20 to about 35 percent by weight of water, the said water glass solution being an aqueous solution containing about 40 to about 60 percent by weight of an alkali metal silicate selected from the group consisting of sodium and potassium silicate, and from about 50 to about 300 g. of said water glass solution being added per kg. of the aqueous resol solution and wherein the said foaming agent is selected from the group consisting of paraffins having 4 to 6 carbon atoms, low boiling halogenated hydrocarbons and pulverulent carbonates.
    (b) adding to the said preblend mixture with mixing an acid curing agent in order to initiate the foaming and curing reactions, and finally
    (c) permitting the mixture formed in (b) above to foam and cure simultaneously thus yielding a non-flammable, rigid, foamed phenol-formaldehyde resin composition.

2. The process of claim 1 wherein in (a) the liquid preblend mixture also contains a pulverulent inorganic filler.

3. The process of claim 1 wherein in (b) the said acid curing agent is selected from the group consisting of toluene sulfonic acid, hydrochloric acid, sulfuric acid and phosphoric acid.

4. The process of claim 2 wherein the said liquid preblend mixture is prepared by mixing together an aqueous phenol-formaldehyde resol solution having a phenol/formaldehyde mole ratio of about 1.64 and wherein the said resol solution contains about 27 to about 30 percent by weight of water; an aqueous solution of sodium silicate having about 45 to about 50 percent by weight of sodium silicate, vermiculite and pentane and wherein the said curing agent is toluene sulfonic acid.

5. The product formed by the process of claim 1.

6. The product formed by the process of claim 2.

7. The product formed by the process of claim 4.

8. A structural member of a non-flammable, rigid, foamed, phenol-formaldehyde resin as defined in claim 1.

9. An insulating composition of a non-flammable, rigid, foamed, phenol-formaldehyde resin as defined in claim 1.

10. The process of claim 1 wherein the foaming agent is pentane.

11. The process of claim 1 wherein the said foaming agent is paraffin having from 4 to 6 carbon atoms.

References Cited
UNITED STATES PATENTS

| | | | |
|---|---|---|---|
| 3,419,495 | 12/1968 | Weldes et al. | 260—2.5 FP |
| 2,804,398 | 8/1957 | Hooks | 260—2.5 FP |
| 2,664,405 | 12/1953 | Anderson et al. | 260—2.5 F |
| 3,502,610 | 3/1970 | Thompson | 260—2.5 FP |

MURRAY TILLMAN, Primary Examiner

M. FOELAK, Assistant Examiner

U.S. Cl. X.R.

260—2.5 F, 29.3, 38, DIG. 24